US 6,629,143 B1

(12) United States Patent
Pang

(10) Patent No.: US 6,629,143 B1
(45) Date of Patent: Sep. 30, 2003

(54) MOBILE COMPUTING SYSTEM AND METHOD FOR A NETWORK

(75) Inventor: Hwee Hwa Pang, Singapore (SG)

(73) Assignee: Kent Ridge Digital Labs, Singapore (SG)

( * ) Notice: Subject to any disclaimer, the term of this patent is extended or adjusted under 35 U.S.C. 154(b) by 0 days.

(21) Appl. No.: 09/478,716

(22) Filed: Jan. 6, 2000

(30) Foreign Application Priority Data

Mar. 18, 1999 (WO) .............................. PCT/SG99/00037
Aug. 11, 1999 (SG) ............................................. 9903866
Jul. 24, 1999 (SG) ............................................. 9903604

(51) Int. Cl.[7] .......................................... G06F 15/173
(52) U.S. Cl. ...................................... 709/226; 709/224
(58) Field of Search ............................... 709/203, 217, 709/224, 245, 324, 226

(56) References Cited

U.S. PATENT DOCUMENTS

| 5,341,477 A |   | 8/1994  | Pitkin et al. ................. 395/200 |
| 5,740,370 A | * | 4/1998  | Battersby et al. ........... 709/219 |
| 5,801,691 A |   | 9/1998  | Dahl ........................... 345/339 |
| 5,828,840 A |   | 10/1998 | Cowan et al. ......... 395/200.33 |
| 6,240,442 B1 | * | 5/2001  | Domenikos et al. ........ 709/203 |
| 6,389,427 B1 | * | 5/2002  | Faulkner .................. 704/104.1 |

FOREIGN PATENT DOCUMENTS

| DE | 19714521 | 11/1997 |
| EP | 0883270  | 12/1998 |
| JP | 08223631 | 8/1996  |

OTHER PUBLICATIONS

Patent Abstract of Japan of JP 08223631 Dated Aug. 30, 1996.

* cited by examiner

Primary Examiner—Mehmet B. Geckil
(74) Attorney, Agent, or Firm—Ladas & Parry

(57) ABSTRACT

A computing system provides a mobile computing environment of settings, accessible programs and accessible files for a user. The computing system is connectable to remote storage and has a local computing environment of settings, accessible programs and accessible files, an operating system, and a local storage. The computing system also includes an application program and a process manager for invoking the application program. The process manager allocates the& execution location of the application program when the application program is invoked, being an intermediary between the application program and the operating system.

40 Claims, 13 Drawing Sheets

MOBILE COMPUTING SYSTEM AND METHOD FOR A NETWORK

FIELD OF THE INVENTION

The present invention relates generally to the field of network computing. In particular, the present invention relates to network computing which provides a mobile computing environment.

BACKGROUND

Historically, computers were large and expensive processors that had to be located at special premises and that few could afford to own and maintain. To benefit from the then powerful computing and processing capabilities of a computer of the past, a user had to access the premises where the computer was located and take multiple steps and procedures that were unique to the computer in order to operate the computer.

Currently, through technological evolution, one of the successors of these large and expensive computers is a small and affordable notebook computer. More importantly, however, such a notebook computer may provide computing power with the ability to execute complex applications and complex formulae involving large numbers at high processing speeds. Such an evolution in computing technology is made possible partially because of the advent of integrated circuit technology that enables the integration of electronic circuits into small electronic devices. The advancement of technology and related skills in manufacturing and software programming and/or engineering also contributes to this evolution.

The evolution of computer technology also significantly impacts the evolution of network technology. Modern network technology allows users who are connected to a network to share resources that are connected to the network. Currently, networks can either cover a small geographical area, such as a local area network (LAN), or a wide geographical area, such as the coverage provided by the Internet or an Internet. Recognizing the market potential of coupling modem computing technology that provides for small, portable, and powerful computers, and the wide coverage of the Internet, the computer industry has placed many modem computing products and services of sorts on the computer marketplace.

One example of such products and services currently being commercialized is based on the concept of mobile computing with minimal local storage usage. This means that modem mobile computer manufacturers can leverage off the implementation of minimal local storage such as the local hard disk, therefore accentuating the compactness of modem mobile computers. The modem mobile computer can therefore be dedicated to, for example, networking, communications and image processing.

Another example of the products and services currently being commercialized is based on the concept of a "mobile" user. The mobile user in one context refers to a computer user who uses a modem mobile computer. In another context, the mobile user refers to a computer user that hops from computer to computer within a "boundary" defined by a network to which the mobile user subscribes or is connectable. The mobile user, hereinafter used in the latter context, thus performs work using whichever computer the mobile user accesses within the network.

When any computer user utilizes a computer, the computer user is basically working on a set or sets of information using the computer's processor. Generally, the information is found on a local storage device such as the local hard disk or a storage medium such as a Compact Disc Read Only Memory (CD ROM). However, the information may also reside on a remote storage that is accessible through, for example, a network. Irrespective of the storage location, it is a fundamental requirement that the computer provides means of storing and/or retrieving the information. For example, when the mobile user hops from computer to computer, the computer user may either use floppy diskettes, CD ROMs, card memories, or any other form of storage medium for providing the information that the mobile user is dealing with. To minimize the use of such storage media that need to be transported, remote storage may be used. When the mobile user wishes to access a remote storage, the mobile user is required to connect to another computer controlling the remote storage either directly or through a network. Such a network could either cover a small geographical area such as a LAN, or a wide geographical area such as the Internet.

In both examples, there appear to exist advantages to using remote storage for the reasons of either improving the compactness of the modern mobile computer or lessening the need to transport the above mentioned storage media.

Currently, some Internet-based products or services such as Web portals, to which a computer user may subscribe, provide accounts with electronic mailboxes, personal starting Web pages, and file directories. These can be accessed from any computer the subscriber uses as long as a Web Browser application program and an Internet link are available on that computer. The subscriber needs to simply login to the Web portal account and thus is able to use the mailbox or access a file from the file directory that is provided by the account. This is a very useful concept for providing computer users with access to the same information and resources at all times regardless of whether the computer users are at home, in the office, or travelling. This idea is also made possible largely because the concept of remote storage access exists.

However, one shortcoming attendant on a Web portal product or service is that a Web portal account is accessible only through a Web Browser. This means that the Web portal account is distinct from the subscriber's other network or remote access accounts that may exist at the office, at home, or with any Internet service provider. Typically, only the email component of the Web portal account may be integrated with the subscriber's other accounts using protocols such as POP3 or IMAP. A practical consequence of this distinction is that a data file residing on one account cannot be opened directly by a program that requires such a data file if the program is installed on another account. Instead, the data file has to be moved manually to the account where the program is installed first.

Another attendant shortcoming is that the subscriber has to work with different environment settings, shortcuts, directory structures, and the like, when the subscriber works on the different accounts from the different computers. Such are components of a computing environment that provides the "look and feel" of the user interface, file access, directory access, and execution of application program of a computer.

In an attempt to overcome one or more of the above problems, conventional methods exist in the marketplace. One such conventional method seeks to address the problem of locating files residing on different file directories of different accounts by using file attributes. From the file attributes, it can be determined if for example a requested file is located on the local storage of the computer or on a remote storage. If the file attribute of a file indicates that the requested file is stored on the remote storage, a file system driver in the operating system of the computer passes control to high level drivers to continue processing the request as an input/output (I/O) request. However, such a conventional method does not address the problem adequately because only remote storage supported by communications protocols congruent with the communications protocols supported by the operating system is accessible. Moreover, such a conventional method does not specifically address the other problems mentioned in the foregoing.

Another conventional method addresses the problem of accessing different resources on the Web through overwriting shared libraries used by application programs on the computer. This however implies that such a conventional method cannot support application programs that utilize static libraries. Hence, the application of such a conventional method is restricted to access of files by application programs that utilize only shared libraries. Moreover, such a conventional method also does not address the problem adequately because there is no provision to access remote storage on a file server. This conventional method also does not specifically address the other problems mentioned in the foregoing.

A further conventional method addresses the problem of accessing files through a distributed server environment by use of a central file management device or system that maintains a virtual file management table for indicating the virtual identification (ID) and the physical location of files. Requests originating from application programs for files are directed from the central file management system to the appropriate server based on the actual physical location of the files. This conventional method however involves additional hardware, software, firmware, and the like for providing the central file management system. This implies additional cost and effort on implementation of such a conventional method, which is not desirable. Also, this conventional method does not specifically address the other problems.

In addition to providing means of connecting a computer to a remote storage, a network may also provide means of sharing out the computation or processing of tasks that are invoked on the computer. Typically, a user invokes tasks on the computer when the user executes an application program on the computer. However, the computer's local resources may not always match the operational requirements of some application programs. For example, the computer's Random Access Memory (RAM) size and/or Central Processing Unit (CPU) speed may not be sufficiently large and/or fast enough, respectively. To use any one of those incompatible application programs, the user must then either re-install the application program on a computer with matching local resources or a computer connected to a network that enables distributed processing. That is, a network that allows computation or processing work to be performed by separate computers connected to the network. A typical example of such a network is a client/server LAN that makes use of distributed intelligence to treat both the server and the individual client as intelligent, programmable machines, thus exploiting the full computing power of each.

However, such client/server architectures are typically rigid and therefore the distribution of functionality between the server and the individual client in these architectures is fixed. In the context of a conventional client/server LAN where which individual client is performing front-end processing and which server is performing back-end processing is predetermined, a user who consistently uses a particular client for a running a particular application program may find that the arrangement works well. However, in the context of the same-client/server LAN, a mobile user may find that the arrangement inadvertently perpetuates suboptimal performance and/or resource utilization. This is because the mobile user may hop from client to client within the client/server LAN, and from each client wishes to use the same application program. The same application program, as can be appreciated, may be suitably executed on one client and not on another client. This is because there are different types of application programs, some of which are based on the "thin-client" model while others are based on the "fat-client" model. A thin-client application program, such as a terminal—or Web-based thin-client application program, is one that is written for use with a client that performs less processing than the corresponding server. A fat-client application program on the other hand is one that is written for use with a client that performs more processing than the corresponding server. Hence, a top-of-the-range computer serving as a client may be under-utilized when executing a thin-client application program while an outmoded computer serving as another client may not have the resources or be able to properly execute a fat-client application program.

Hence, it is clear that the matching of computer resources with the operational requirements of application programs poses a problem, in particular to the mobile user in the context of a conventional network that provides distributed processing. This problem, however, is not addressed by conventional methods.

From the discussion of conventional methods, it is clear that a need exists for an adequate solution to overcoming or at least ameliorating one or more of the disadvantages described in the foregoing.

SUMMARY

Various aspects of the invention are directed to ameliorating or overcoming at least one or a combination of the above disadvantages or inadequacies of conventional methods. In particular, it is desirable to provide portable or mobile computing within the context of a network wherein a computing environment may be migrated to any computer that is connectable to the network for providing a user with a consistent computing environment. It is also desirable to provide a consistent computing environment according to a dynamically adaptable communications protocol that allows transparent connectivity to Web resources, file servers and the like. It is further desirable to provide a consistent computing environment wherein the information regarding files stored on remote storage is self-contained within the computer. It is even further desirable to provide a consistent computing environment that enables dynamically-adaptive distributed processing within the network.

In accordance with a first aspect of the invention, there is disclosed a computing system for providing a mobile computing environment for a user, the computing system being connectable to remote storage and having a local computing environment, an operating system, and a local storage, the computing system including: an application program; means for invoking the application program; and means for allocating the execution location of the application program when the application program is invoked, wherein the allocating means is an intermediary between the application program and the operating system.

In accordance with a second aspect of the invention, there is disclosed a computation server for providing a mobile computing environment for a user on a computing system, the computation server being connectable to remote storage and having a local computing environment, an operating system, and a local storage, the computation server including: means for communicating information of resources on the computation server for allocation of execution location of an application program resident on the computing system; and means for monitoring and coordinating the execution of the application program when allocated to the computation server.

In accordance with a third aspect of the invention, there is disclosed a method for providing a mobile computing environment to a computing system for a user, the computing system being connectable to remote storage and having a local computing environment, an operating system, and a local storage, the method including the steps of: providing an application program; invoking the application program; and allocating the execution location of the application program when the application program is invoked by including an intermediary between the application program and the operating system.

In accordance with a fourth aspect of the invention, there is disclosed a method for providing a mobile computing environment on a computing system for a user using a computation server, the computation server being connectable to remote storage and having a local computing environment, an operating system, and a local storage, the computation server including: communicating information of resources on the computation server for allocation of execution location of an application program resident on the computing system; and monitoring and co-ordinating the execution of the application program when allocated to the computation server.

In accordance with a fifth aspect of he invention, there is disclosed a computer program product for providing a mobile computing environment for a user, including a computer usable medium having computer readable programs code means embodied in the medium for causing the mobile computing environment to be provided to a computing system, the computing system being connectable to remote storage and having; a local computing environment, an operating system, and a local storage, the computer program having computer readable program code means for providing an application program; computer readable program code means for invoking the application program; and computer readable program code means for allocating the execution location of the application program when the application program is invoked by including an intermediary between the application program and the operating system.

In accordance with a sixth aspect of the invention, there is disclosed a computer program product for providing a mobile computing environment for a user on a computing system, including: a computer usable machine having computer readable program code means embodied in the medium for causing the mobile computing environment to be provided using a computation server, the computation server being connectable to remote storage and having a local computing environment, an operating system, and a local storage, the computer program product having: computer readable program code means for communicating information of resources on the computation server for allocation of execution location of an application program resident on the computing system; and computer readable a program code means for monitoring and coordinating the execution of the application program when allocated to the computation server.

BRIEF DESCRIPTION OF THE DRAWINGS

Embodiments of the invention are described hereinafter with reference to the drawings, in which:

FIG. 5b is a detailed flow diagram illustrating further details of program execution modules of FIG. 5a;

DETAILED DESCRIPTION

Figure 1:
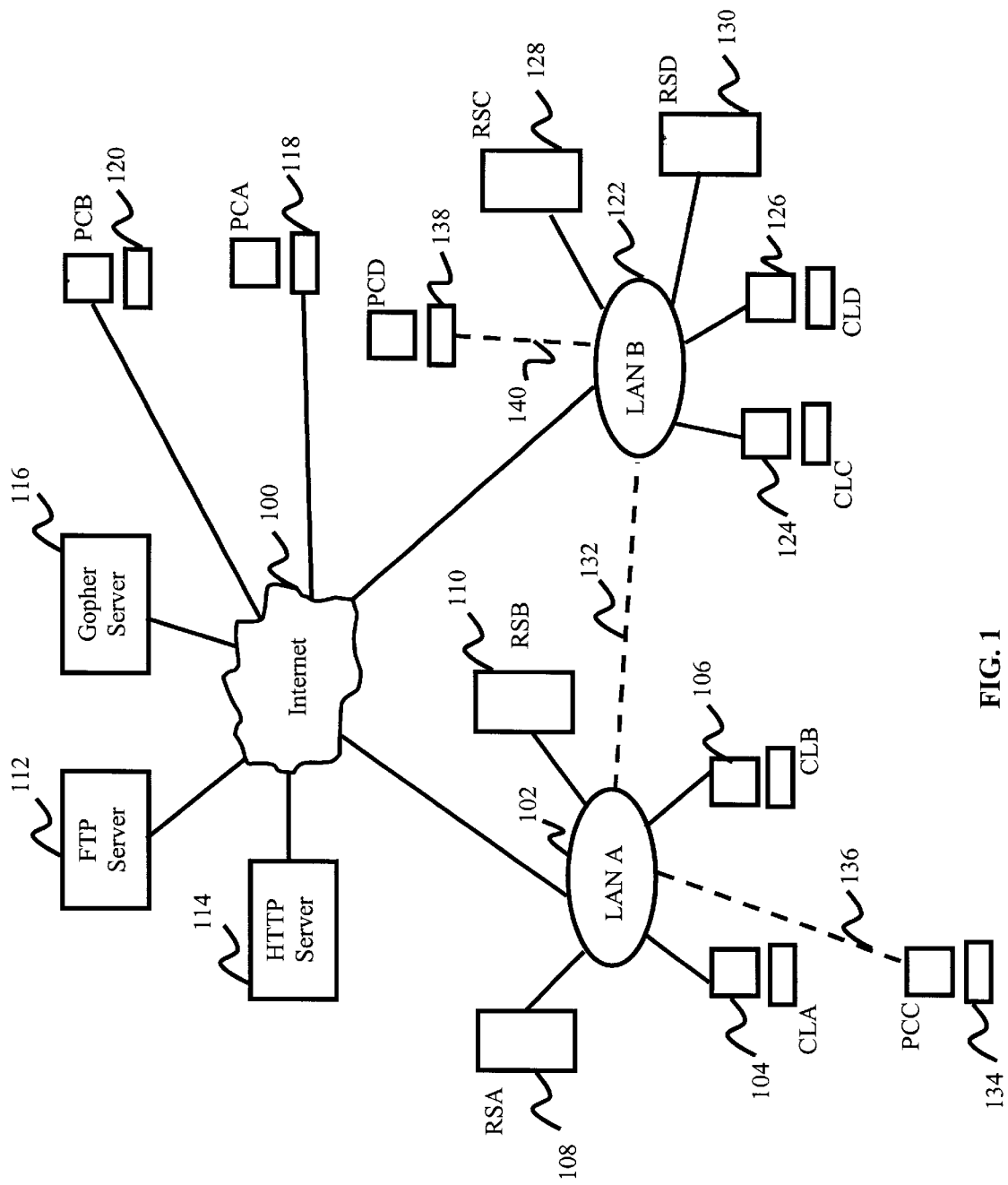
FIG. 1 is a contextual block diagram depicting a client according to a preferred embodiment of the invention connected to a LAN and to the Internet through the LAN.

A system is needed that can integrate the environment settings, application programs, and files of accounts belonging to a subscriber so that a consistent computing environment is achieved. This consistent computing environment should be attachable to and detachable from any computer a computer user is using, regardless of the location of the computer as long as the computer is connectable to a network that provides the appropriate resources. Also, such a consistent computing environment should provide means to optimize performance and/or resource utilization on the computer to which the consistent computing environment is attached.

A computing system, a method, and a computer program product for providing portable or mobile computing within the context of a network are described. In particular, a computing environment may be migrated to any computer on the network to provide a user with a consistent and dynamically-adaptive distributed processing computing environment. In the following description of several embodiments, numerous details are described in order to provide a more thorough description of these embodiments. It becomes apparent to one skilled in the art, however, that the invention may be practiced without those specific details. In other instances, well-known details have not been described at length so as not to obscure the invention.

The advantages of the embodiments of the invention are manifold. A first advantage is that at least one embodiment allows a computer user to use the same application programs or work with the same documents from any computer within the network. The computer user in this instance has multiple network, remote access, or Internet access accounts that are accessible through different computers having compatible operating systems. Through any one of the accounts and using any one of the computers, the computer user can use the application programs or work with the documents as though the application programs or documents are installed or reside on that computer.

A second advantage is that at least one embodiment provides a mobile computing environment which is attachable to different computers having compatible operating systems. As a consequence, the computer user is provided with a consistent and therefore familiar computing environment, regardless of whether the computer user configures that computer or not.

A third advantage is that at least one embodiment enables application programs that are installed on remote servers to which the computer is connected to be executed on that computer.

A fourth advantage is that at least one embodiment provides connectivity between the computer and different types of remote servers through dynamic adaptation of communications protocols. For example, in one instance, the computer user can access a remote server within a LAN to which both the remote server and the computer are connected using one type of communications protocol. In another instance where the computer user is travelling and therefore is outside the firewall of the LAN, another type of communications protocol is used.

A fifth advantage is that at least one embodiment provides for encrypted files stored on remote servers to be decrypted only on the computer that the computer user is using. This provides a security measure and thus ensures that the computer user can safely use remote servers that may be accessible to the public for remote storage. Such a security measure remains transparent to the computer user and the application program that is being used.

A sixth advantage is that at least one embodiment provides for a versatile and flexible distributed processing computing environment. By dynamically adapting the distribution of functionality between, for example, a client and a server in a client/server LAN, the computer user may install and/or use on the computer an application program, which is written for or requires either a thin- or fat-client model. This is possible because at least the computer or any corresponding computing device on the network that is capable of handling the processing would match the operational requirements of the application program. The computer on which the application program is installed and/or used shares out the processing required for the execution of the application program to the computing device if the computer does not match the operational requirements of the application program. Such a capability therefore accentuates the mobility of mobile computing within the network.

A seventh advantage is that at least one embodiment provides for multiple documents to be opened concurrently on the computer through multiple application programs, irrespective of the type of operating system for which the application programs are written. This is achieved by executing each application program on a computation server that is installed with the corresponding operating system.

FIG. 1 is a contextual block diagram of a mobile computing environment network formed by the Internet 100 and a network LAN A 102, to which a number of client computers (generally hereinafter known as clients) according to a preferred embodiment of the invention are connected. The LAN A 102 is connected to the Internet 100 and therefore provides the clients access to the resources on the Internet 100, preferably through a firewall. Connected to the LAN A 102 are a number of clients such as CL A 104 and CL B 106. The LAN A 102 importantly provides the client CL A 104 and CL B 106 with access to remote storage on remote servers RS A 108 and RS B 110, which are also connected to the LAN A 102. The LAN A 102 is a typical network implementation in an organization that networks the clients and the remote servers within the boundary of the geographical area occupied by the organization.

Also connected to the Internet 100 are resources such as an FTP server 112, an HTTP or Web server 114, and a Gopher server 116, which may be provided by organizations or individuals and are well known to those skilled in the art. In addition, there are typically individuals or small organizations that connect or link to the Internet 100 through personal computers that are given the designations PC A 118 and PC B 120. These individuals or small organizations are typically connected to the Internet 100 via Internet service providers.

Also shown in FIG. 1 is another network LAN B 122 to which clients CL C 124 and CL D 126, and remote servers RS C 128 and RS D 130 are connected. The LAN B 122 is also a typical network implementation in an organization. The LAN A 102 and the LAN B 122 are connected via a communications link 132, creating a virtual private network between the two organizations. The communications link 132 is a logical communications link and may be implemented through the Internet 100 or a direct or dedicated communications link.

A personal computer PC C 134 is also connected to the LAN A 102 via a remote access connection 136 to a remote access server (not shown). The remote access connection 136 is typically a dial-in connection such as one provided by modems. Alternatively, the remote access connection 136 may also be established via the Internet 100. Similarly, a personal computer PC D 138 is also connected to the LAN B 122 in the same manner.

To one skilled in the art, any one of the personal computers PCs A, B, C, D (118, 120, 134, 138) may be a mobile computer provided with a conventional communications link such as one provided by a modem and a wire line or wireless telecommunications link. Alternatively, each of these PCs may be a computer at an Internet kiosk.

Each of the clients and the personal computers is provided with a Microsoft Windows 95 or compatible operating system (simply referred to as "Windows" hereinafter). Hence, the computing environment of each of these computers includes the "look and feel" of the Windows user interface and access to files, directories, and application programs. A consistent Windows computing environment is therefore one that is available to a computer user regardless of whichever Windows client or personal computer the computer user chooses to use. The computing environment is attachable to and detachable from the chosen client or personal computer using information that is stored remotely. For purposes of maintaining a consistent Window computing environment, the information pertaining to the computing environment is updated at the source of the information before detachment if the computer user has changed the computing environment. This therefore enables the consistent Windows computing environment to provide the computer user with familiar Windows settings and user interface as long as the computer user connects to the mobile computing environment network.

As the clients and personal computers may also be running an Apple Computer Corporation's Macintosh operating system or UNIX operating system, the mobile computing environment is capable of translating the components in each computer user's personalized consistent computing environment, whether based on Windows, Macintosh or UNIX operating system, to appropriate components on the respective clients and personal computer. This gives the same consistent "windowing" environment regardless of the operating system on the clients and personal computers. For the sake of brevity, only clients and personal computers running the Windows operating system are hereinafter described.

Additionally, the computing environment also provides access to application programs regardless of whether the computer's resources match the operational requirements of the application programs. The computer's resources include the RAM size, the CPU speed, the type of operating system, and the like. If the computer does not have the compatible resources for performing computation or processing necessary for execution of the application program, the computer then shares out the computation or processing with another client, personal computer or server on the mobile computing environment network.

Every computer user who has access to the mobile computing environment network is provided with an account for attaching that computer user's unique or personalized consistent Windows computing environment to any of the clients or personal computers connected to the mobile computing environment network. Hence, a computer user may on one day attach the personalized consistent Windows computing environment to the CL A 104 and on another day attach the same to the PC B 120 because the computer user is travelling.

To attach a consistent Windows computing environment to a computer connected to the mobile computing environment network, the computer user has to access the computer user's mobile computing environment network account through any network account, remote access account, or Internet access account that the computer user has access to. A network account typically allows the computer user to access the LAN A 102 from within the organization that implements the LAN A 102, thereby providing the computer user access to remote storage on for example, the remote servers RS A 108 and RS B 110. A remote access account typically allows the computer user to access the LAN A 102 from outside the organization's firewall. An Internet access account typically provides the computer user with access to the resources on the Internet 100 and also the Internet service provider's host resources.

Figure 7A:
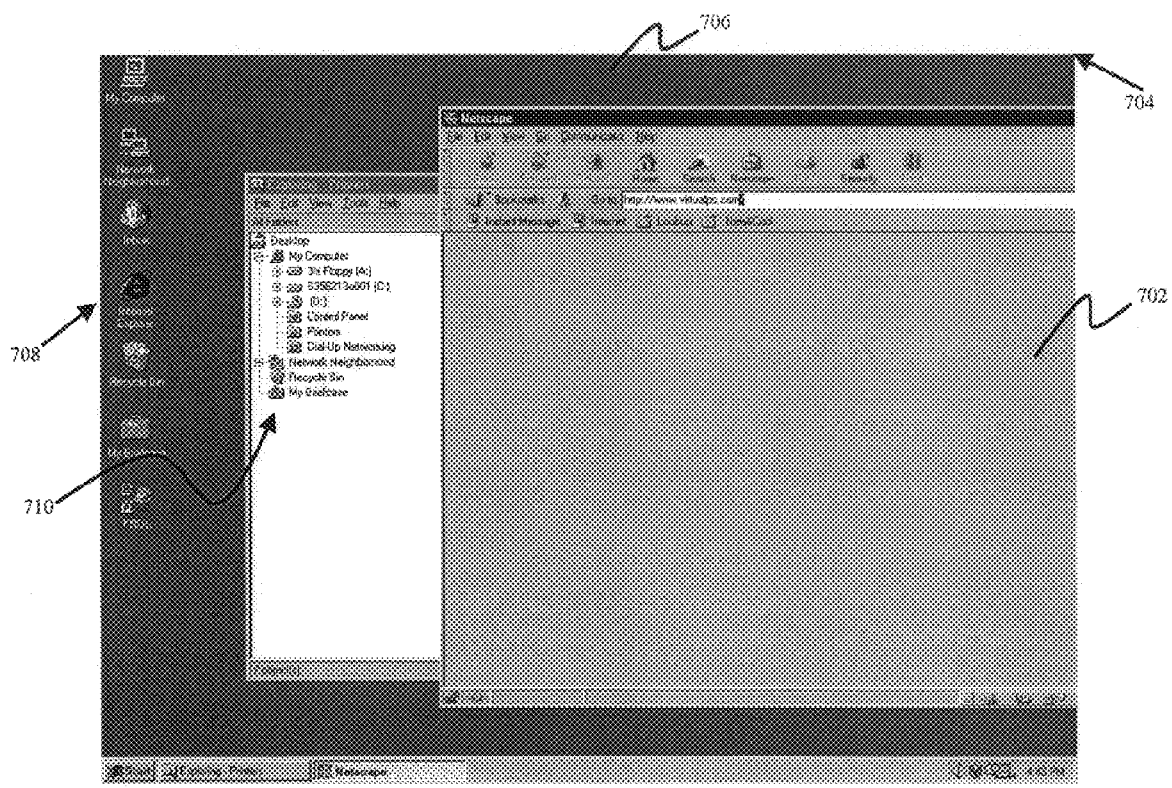
FIGS. 7a and 7b respectively illustrate examples of the components of an original computing environment and a consistent and dynamically-adaptive distributed processing computing environment migrated onto the client shown in FIG. 1 wherein the user interface, file access, directory access, and shortcuts to application programs are provided.

The computer user's mobile computing environment network account through any of these accounts is accessed using a Windows Internet Browser application program. One well-known Internet Browser application program Netscape Navigator is shown in FIG. 7A and designated as browser 702. Other browsers, known to those skilled in the art such as Internet Explorer may be used as well. FIG. 7A also shows the other components of a Windows computing environment, such as a Windows desktop 704 displaying a wallpaper 706, a group of icons 708, and a directory mapping 710.

Once the computer user accesses the mobile computing environment network account using the browser window 702, the computer user's personalized consistent Windows computing environment is attached to the computer. The Windows desktop 704 is transformed to provide the personalized consistent Windows computer environment to the computer user.

Figure 7B:
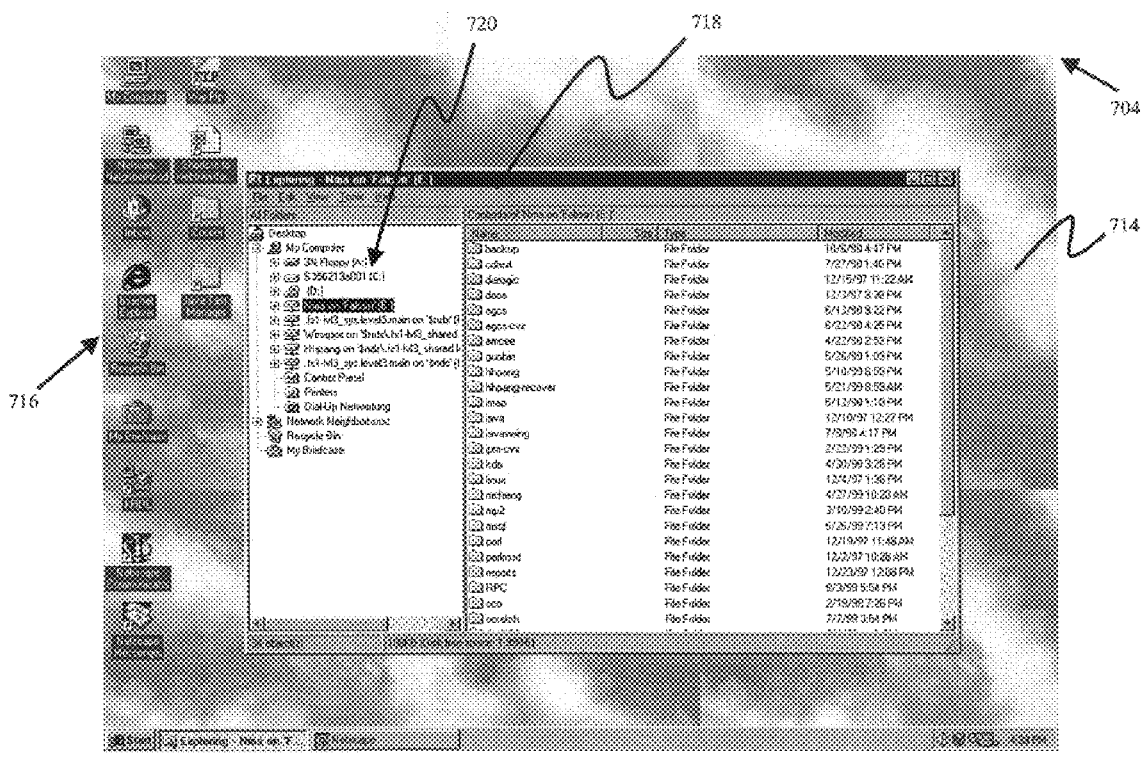

Components of the computer user's personalized consistent Windows computing environment are shown in FIGS. 7B, which includes the Windows desktop 704 displaying a new wallpaper 714, a new group of icons 716, and an active window 718. The active window 718 provides a new directory mapping 720, which shows directories on whichever network access, remote access, or Internet access account the computer user chooses to use for accessing the mobile computing environment network account. The new directory mapping 720 also shows directories on the local storage of the computer the computer user is using, and also on the mobile computing environment network account.

Some of the icons in the new group of icons 716 are shortcuts to some documents found on the virtual directories mapped in the active window 718, while some are shortcuts to application programs installed on those directories. Depending on the processing capability of and resources available on the computer used by the computer user, the processing of some of these application programs invoked through the respective shortcuts may be performed on the computer or another client, personal computer or server. The other icons 716 are associated with documents and application programs local to the computer.

The personalized consistent Windows computing environment is then detached from the computer after the computer user no longer requires working with the personalized Windows computing environment. The operations involving attaching a consistent Windows computing environment to and detaching the same from a computer are described with reference to FIGS. 2–6.

Figure 2A:
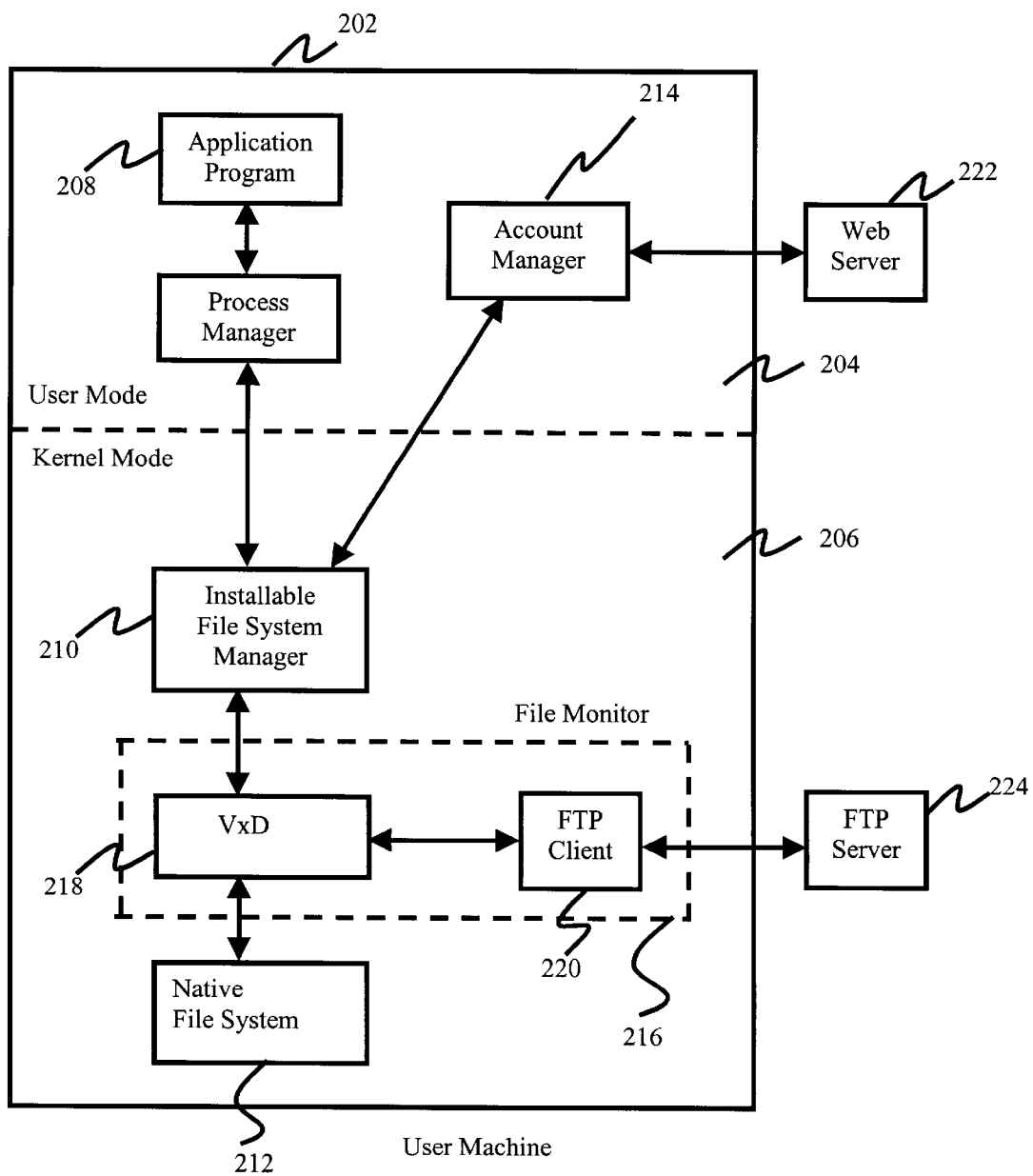
FIG. 2a is a block diagram illustrating the components of the client shown in FIG. 1 and the logical connections to the LAN and the Internet when program execution is done locally.

In FIG. 2a, a diagram illustrates the components or modules in a client or personal computer according to the preferred embodiment of the invention. Such components may be implemented through hardware, software, firmware, or a combination of these. For purposes of brevity, a reference made hereinafter to a client 202 refers to any one of the clients or personal computers connected to the mobile computing environment network. In the client 202, there exist two modes: a user mode 204 and a kernel mode 206. The user mode 204 generally refers to that part of the client 202 that interacts with the computer user or extrinsic devices, and the kernel mode 206 generally refers to the Windows operating system of the client 202. Examples of components of the user mode 204 are an application program 208 and a Process Manager 226, and examples of components of the kernel mode 206 are an Installable File System Manager 210 and a Native File System 212. When the computer user accesses the mobile computing environment network account from the browser 702, an Account Manager 214, a File Monitor 216 and the Process Manager 226 are invoked. The Account Manager 214 is an application program and therefore is part of the user mode 204. The Process Manager 226 is an intermediary that is layered over the Installable File System Manager 210. The File Monitor 216 has two components: a Virtual Device Driver 218 and an FTP Client 220. The Virtual Device Driver 218 is a hook within the kernel mode 206 that is layered over the Native File System 212 and thus remains in the kernel mode 206. The FTP Client 220 is another program in the kernel mode 206.

The mobile computing environment network account according to the preferred embodiment is provided by preferably a Web portal service. Hence upon accessing the Web portal account, the client 202 gains access to a Web Server 222 through the Account Manager 214. On the other hand, the FTP client 220, as the name suggests, provides the client 202 access to an FTP Server 224. The Account Manager 214 attaches the computer user's personalized consistent Windows computing environment to the client 202 using information downloaded from the Web Server 222. The Account Manager 214 also uploads changes to the computer user's personalized Windows computing environment to the Web Server 222, and thereafter restores the original computing environment to the client 202 when the computer user exits the Web portal account.

When the Account Manager 214 attaches the computer user's personalized consistent Windows computing environment to the client 202, the Account Manager 214, amongst other things described in the foregoing, migrates application programs to the client 202 by providing shortcuts to these application programs. To those skilled in the art, to properly run or execute any application program requires files associated with and/or used by the application programs have to be accessible to the application programs. Another consideration is that the client 202 must also match the operational requirements of the application programs in terms of resources and processing capability. Since the client 202 may be any client or personal computer at any part of the mobile computing environment network, whether a match is made between the client 202 and the application programs for proper execution is only determinable upon invoking the respective shortcuts. If a match is not made, the processing or execution of these application programs is distributed to the mobile computing environment network. Hence, a mechanism is provided to decide on or allocate the execution location of the application programs, which may be the client 202, or any other compatible client, personal computer or server on the mobile computing environment network.

Such a mechanism involves the Process Manager 226, which is also layered beneath the application programs in the user mode 204 when the personalized consistent Windows computing environment is attached to the client 202. By having such an arrangement where the Process Manager 226 is an intermediary between the application programs and the Installable File System Manager 210, any interaction between the application programs and the Installable File System Manager 210 is intercepted by the Process Manager 226. Thus when the computer user invokes the respective shortcuts, the Process Manager 226 intercepts such interactions and uses property information associated with the application programs for allocating the execution locations of the application programs. Such information includes the operating system types and versions, for example Windows 95, Windows NT or Solaris 2.5.1, for which the respective application programs are written. The information also includes the processor types, for example Intel Pentium or Sun Sparc, and the memory sizes, for example 32 Mbytes or otherwise, on which the respective application programs run. The Process Manager 226 compares this information with the specification of the resources on the client 202, this specification being stored in the Windows system registry. If there is a match between any application program and the client 202, that application program is executed locally. Otherwise, a process is initiated that allows that application program to be executed on a separate client, personal computer or server on the mobile computing environment network.

If the application programs are executed locally, and since only the shortcuts to application programs are available to the client 202 while the associated files are not, for reasons already discussed, a mechanism is therefore provided to redirect the requests for these files to the remote storage of the files. This remote'storage is the FTP Server 224 and the Virtual Device Driver 218 intercepts any file system requests made by the shortcuts to the application programs to the Native File System 212. The Virtual Device Driver 218, by intercepting these requests, is able to check these requests and determine if the target files are available locally or on the FTP Server 224. If a target file is found only on the FTP Server 224, the Virtual Device Driver 218 communicates with the FTP Client 220 so that the FTP Client 220 downloads the target file from the FTP Server 224 to the local storage on the client 202. The Virtual Device Driver 218 thereafter directs the Native File System 212 to satisfy the request for the target file by providing the locally stored copy of the target file.

When the FTP Client 220 receives a file from the FTP Server 224, the FTP Client 220 receives an encrypted file for apparent security reasons. The FTP Client 220 thus decrypts the file before saving the file locally on the client 202. Upon detachment of the personalized consistent Windows computing environment, the files that are altered or changed for example as a result of the execution of migrated application programs are encrypted by the FTP Client 220 before the FTP Client 220 transmits the altered files to the FTP Server 224. Such decryption and encryption activities are transparent both to the computer user and to the migrated application programs.

Figure 2B:
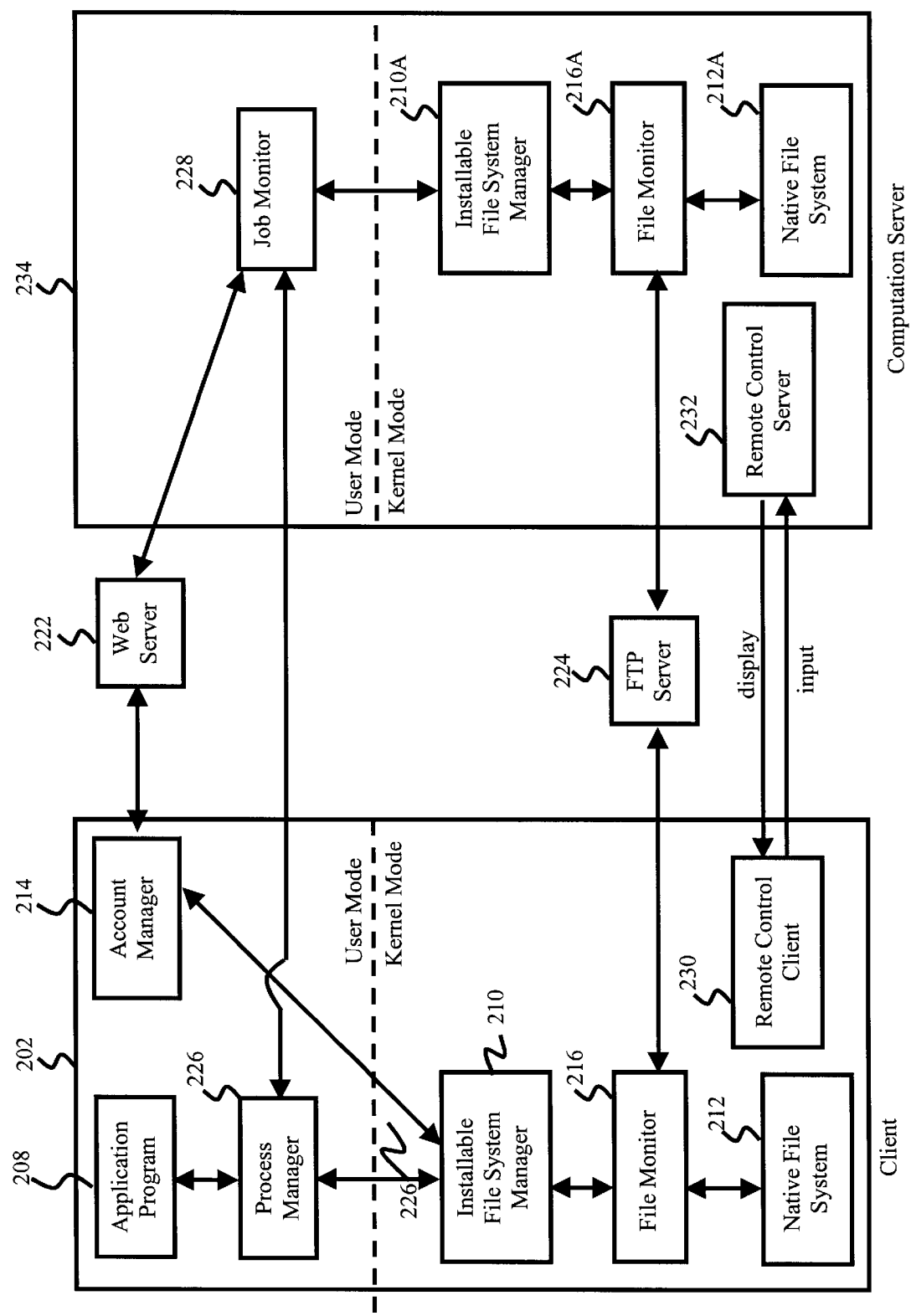
FIG. 2b is a block diagram illustrating the components of the client shown in FIG. 1 and the logical connections to the LAN and the Internet when program execution is shared out to a computation server.

However, if the application programs are not executed locally, the Process Manager 226 then attempts to identify a separate client, personal computer or a server on the mobile computing environment network as a "computation server" 234 as shown in FIG. 2b for each application program. This means that upon identifying the computation server 234 for an application program, the execution for that application program is transferred to the respective computation server 234. This identification process begins with the Process Manager 226 initiating contacts with other clients, personal computers or servers on the mobile computing environment network to which the client 202 has access permission. This is done by using broadcasting techniques. The first client, personal computer or server to respond with matching specification is then chosen as the computation server 234 on the basis that there is a match and that the speed of response reflect the communications speed between the two and the system load. Once the computation server 234 is identified, the client 202 then starts a session with the computation server 234 between the Process Manager 226 and a corresponding Job Monitor 228 in the computation server 234. The Job Monitor 228, also a peer to the Account Manager 214, attaches limited aspects of the same personalized consistent Windows computing environment to the computation server 234 using information from the Web Server 222. A File Monitor 216A that mirrors the functions and operations of the File Monitor 216 in the client 202 is also invoked in the computation server 234. A Remote Control Client 230 in the client 202 and a Remote Control Server 232 in the computation server 234 are also started. By providing these, the client 202 is able to control remotely the computation server 234 by providing input and receiving display information. The execution of the application program is then started at the computation server 234. Where necessary, the File Monitor 216A accesses the FTP Server 224 in a similar manner as the File Monitor 216 would access the FTP Server 224 if the execution had been performed locally at the client 202. Hence, the entire process of transferring the execution of the application program becomes transparent to the computer user.

Figure 3:
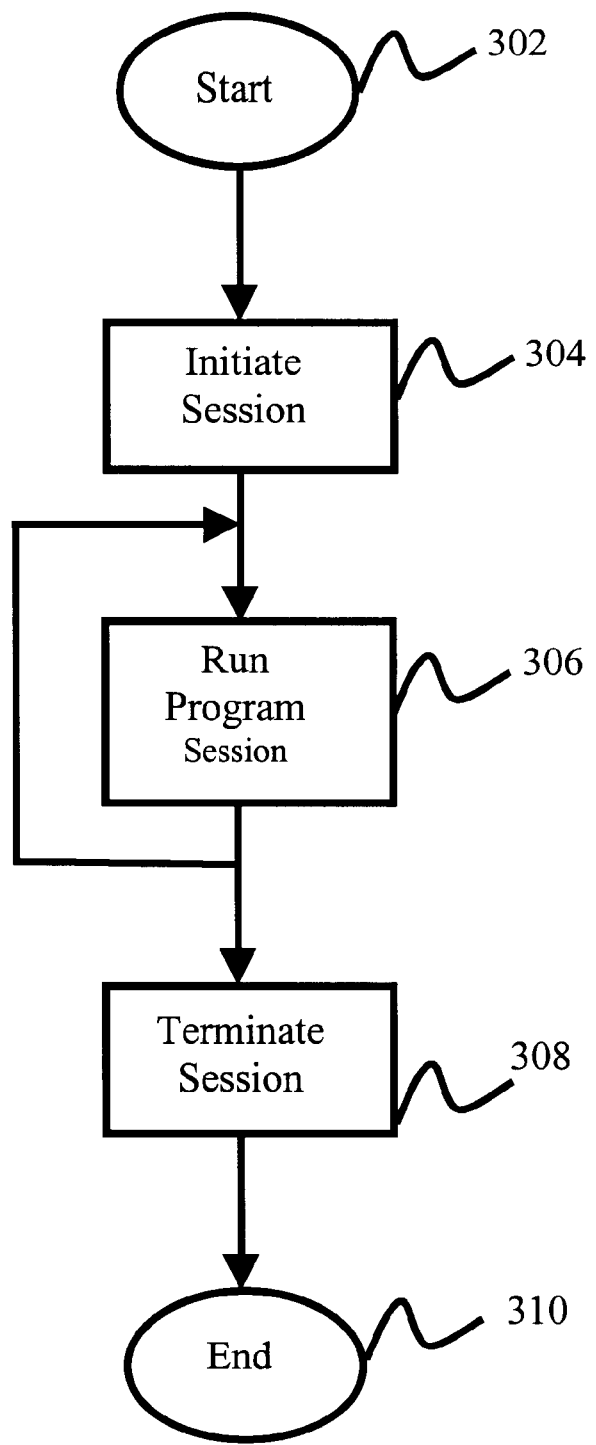
FIG. 3 is a top-level flow diagram illustrating the processes carried out by the client and the computation server shown in FIGS. 2a and 2b for the migration of a consistent and dynamically-adaptive distributed processing computing environment to the client.

A more detailed description of the operation of the preferred embodiment of the invention is provided with reference to FIGS. 3–6. FIG. 3 provides a flow diagram illustrating the three processes carried out by the client 202 and possibly the computation server 234, for the attachment, use, and detachment of the personalized consistent Windows computing environment. After start up, the client 202 begins a first process known as an Initiate Session process 304. A second process known as a Run Program process 306 follows this. The client 202 may loop this process where necessary and until the computer user chooses to terminate the mobile computing environment network account. The operation then ends with a third process known as a Terminate Session process 308.

In the description of these processes, modules in the client 202 are carried out to produce the desired results or effects. Such modules may be implemented through hardware, software, firmware means, or a combination of these.

Figure 4:
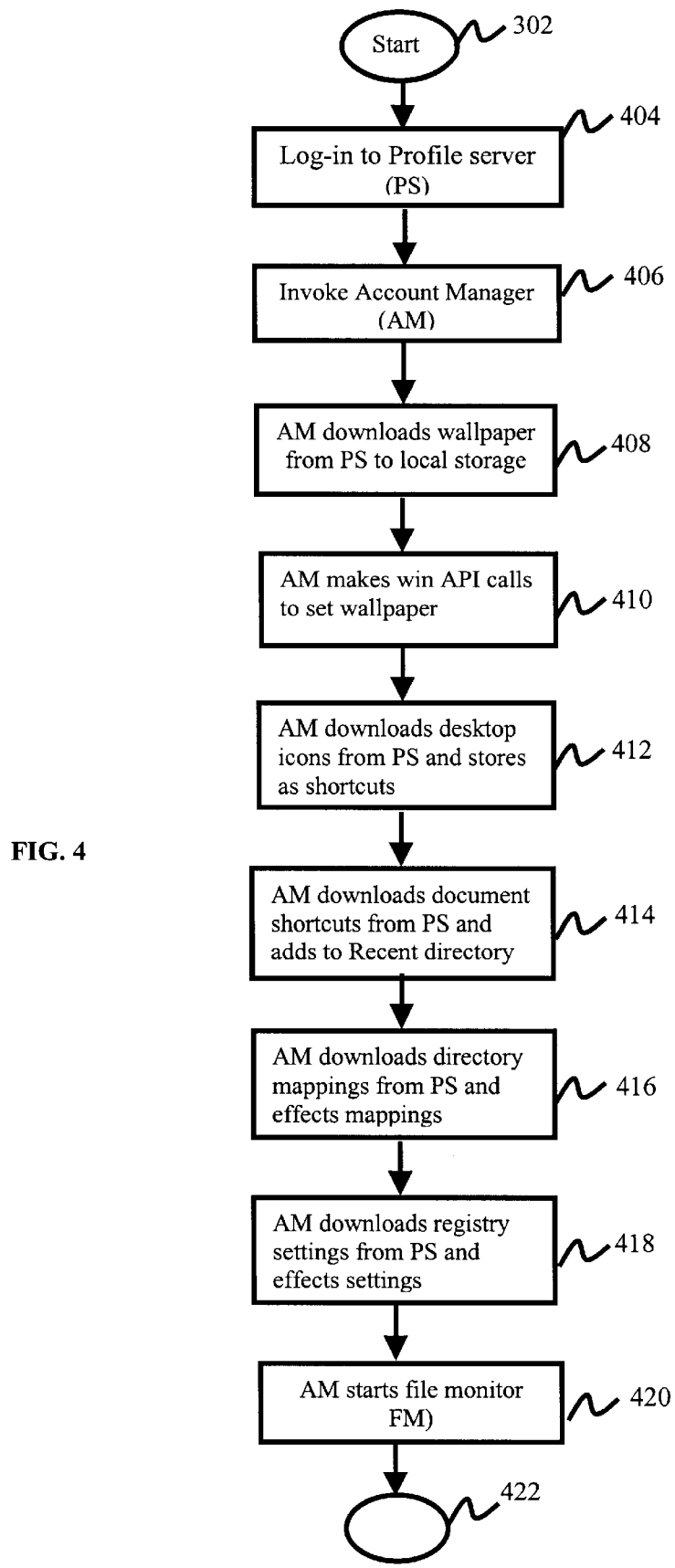
FIG. 4 is a detailed flow diagram illustrating the modules of the Initiate Session process of FIG. 3.

FIG. 4 illustrates the modules involved in carrying out the Initiate Session process 304. After start up, a Login module 404 assumes control and provides access to the Web, or Profile, Server 222. Once access to the Profile Server 222 is gained, an Invoke module 406 assumes control and invokes the Account Manager 214. Thereafter in a Download Wallpaper module 408, the Account Manager 214 downloads a file containing information about the new wallpaper 714 from the Profile Server 222, and stores the file on the local storage on the client 202.

Subsequently in an API Call module 410, the Account Manager 214 makes a Windows API call to change the wallpaper 706 on the desktop 704 to the new wallpaper 714 according to the file downloaded from the Profile Server 222. Windows API calls are generally known to those skilled in the art for providing an interface between application programs and the Windows operating system.

In a Download Icons module 412, the Account Manager 214 downloads a file containing information for the shortcuts to application programs and documents in the new group of icons 716 from the Profile Server 222, and stores these in the "windows Desktop" directory. The Account Manager 214 further in a Download Document Shortcuts module 414 downloads shortcuts to documents from the Profile Server 222, and adds the shortcuts to the "windows-Recent" directory.

The Account Manager 214 then downloads information for the new directory mapping 720 in a Download Mapping module 416 to "mobile desktop" drives on the client 202 from the Profile Server 222. The new directory mapping 720 is effected in the Download Mapping module 416 through a Windows "net use" command or a disk operating system (DOS) "subst" command.

Thereafter, the Account Manager 212 downloads registry settings from the Profile Server 222 and effects the settings on the client 202 in a Download Registry module 418. The Account Manager 212 then starts the Process Manager 226.

The Account Manager 214 completes the current process by starting the Virtual Device Driver 218 and the FTP Client 220 in a Start File Monitor module 420. The personalized consistent Windows computing environment is thereafter successfully attached to the client 202 for the computer user to use.

Figure 5A:
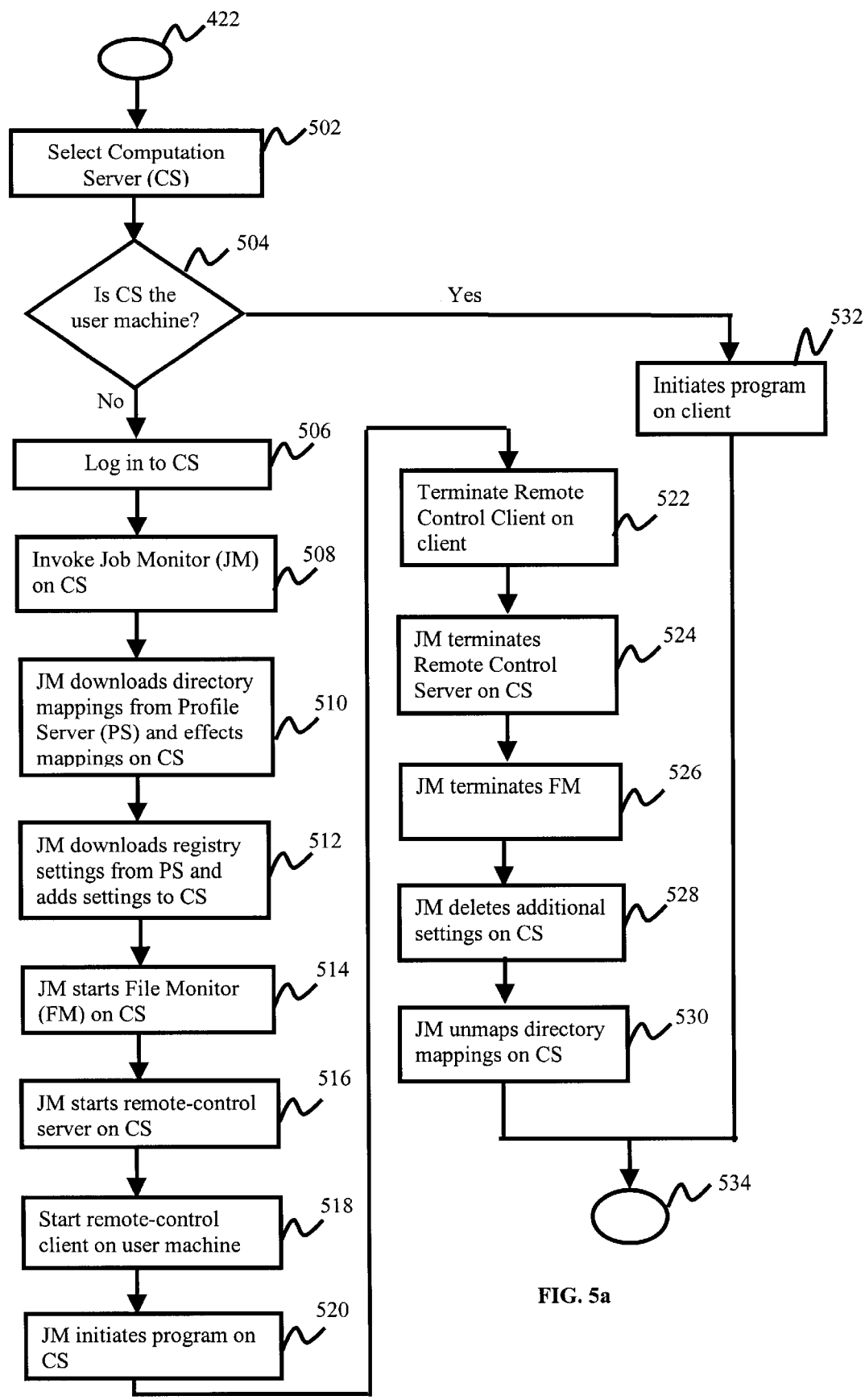
FIG. 5a is a detailed flow diagram illustrating the modules of the Run Program Session process of FIG. 3.

The Run Program process 306 shown in detail in FIG. 5a commences when the Initiate Session process 304 ends and when the computer user selects to execute the application program 208 in the user mode 204. Thereafter, the Process Manager 226 waits and intercepts any interaction between the application program 208 and the Installable File System Manager 210. The Process Manager 226 then uses the property information associated with the application program to allocate the execution location in a Select Computation Server (CS) module 502, the details of which are already described. The Process Manager 226 identifies a compatible computation server 234 if the client 202 does not match the operational requirements of the application program 208. After allocating the execution location, a Test Location module 504 assumes control where if the execution location is the client 202, the condition tests true (YES) and an Initiate Program module 532 assumes control. If the execution location is the computation server 234, the condition tests false (NO) and a Login to CS module 506 assumes control.

In the Initiate Program module 532, the Process Manager 226 allows the interaction between the application program 208 and the Installable File System Manager 210 to continue for purposes of executing the application program 208 according to the description with reference to FIG. 2a. Further details of the local execution of application program 208 are provided with reference to FIG. 5b. After the execution is completed, the Initiate Program module 532 releases control and the Run Program process 306 is looped, if necessary, until the computer user decides to exit the mobile computing environment network account. When this happens, the Run Program process 306 terminates and the Terminate Session process 308 commences.

In the Login to CS module 506, the Process Manager 226 performs a login to commence a communications session with the identified computation server 234. After successful login, an Invoke Job Monitor (JM) module 508 assumes control, where the Process Manager 226 invokes the Job Monitor 228 on the computation server 234. The Job Monitor 228 is an application program pre-installed on all clients, personal computers and servers that have been availed to the mobile computing environment network as potential computation servers 234. Subsequently, the Job Monitor 228 logs in to the Profile Server 222 and thereafter a JM Download Directory module 510 assumes control. In the JM Download Directory module 510, the Job Monitor 228 downloads information for a new directory mapping to "mobile desktop" drives on the computation server 234 from the Profile Server 222. The new directory mapping 720 is effected in the JM Download Directory module 510 through a Windows "net use" command or a DOS "subst" command.

Subsequently, a JM Download Registry module 512 assumes control where the Job Monitor 228 downloads information to registry settings from the Profile Server 222 and effects the registry settings on the computation server 234 accordingly.

Following which, the Job Monitor 228 starts the File Monitor 216A on the computation server 234 in a JM Start FM module 514 which assumes control from the JM Download Registry module 512. Thereafter, in a JM Start Remote-Control (RC) module 516, the Job Monitor 228 starts the Remote Control Server 232 on the computation server 234. Consequently, in a Client Start RC module 518, the client 202 starts the corresponding Remote Control Client 230 when the Job Monitor 228 notifies the Process Manager 226 that the Remote Control Server 232 is started. Both the Remote Control Client 230 and the Remote Control Server 232 interact so that the client 202 is able to control remotely the computation server 234 by providing input and receiving display information.

Upon providing remote control to the client 202, the Job Monitor 228 in a JM Initiate Program module 520 provides for execution of the application program 208 according to the description with reference to FIG. 2a. The details of the execution of the application program 208 on the computation server 234 are described with reference to FIG. 5b. After the execution is completed, the JM Initiate Program module 520 releases control and a Client Terminate RC module 522 assumes control. In this module, the client 202 terminates the Remote Control Client 230 thereby initiating the relinquishment of the remote control over the computation server 234. The Process Manager 226 notifies the Job Monitor 228 of this and consequently, the Job Monitor 228 terminates the Remote Control Server 232 in a JM Terminate RC module 524, completing the relinquishment of the remote control by the client 202.

Thereafter, a JM Terminate FM module 526 assumes control in which the Job Monitor 228 terminates the File Monitor 216A. This is followed by the deletion of the additional registry settings on the computation server 234 in a JM Delete Registry module 528. The Job Monitor 228 then unmaps the directory mapping on the mobile desktop drives on the computation server 234 in a JM Unmap Directory module 530, before the Job Monitor 228 is terminated. Subsequently, the Run Program process 306 is looped, if necessary, until the computer user decides to exit the mobile computing environment network account. When this happens, the Run Program process 306 terminates and the Terminate Session process 308 commences.

Figure 5B:
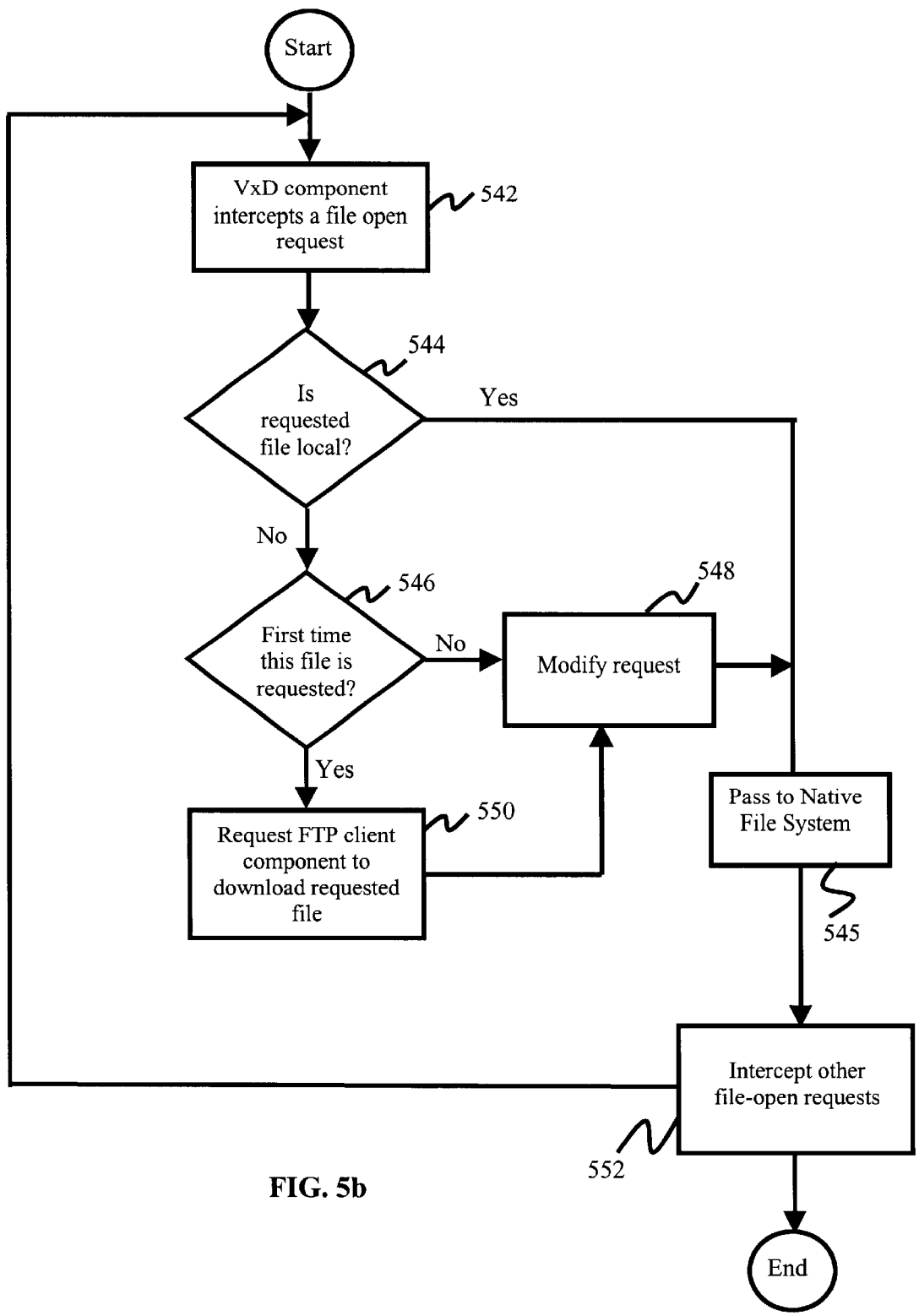
Figure 6:
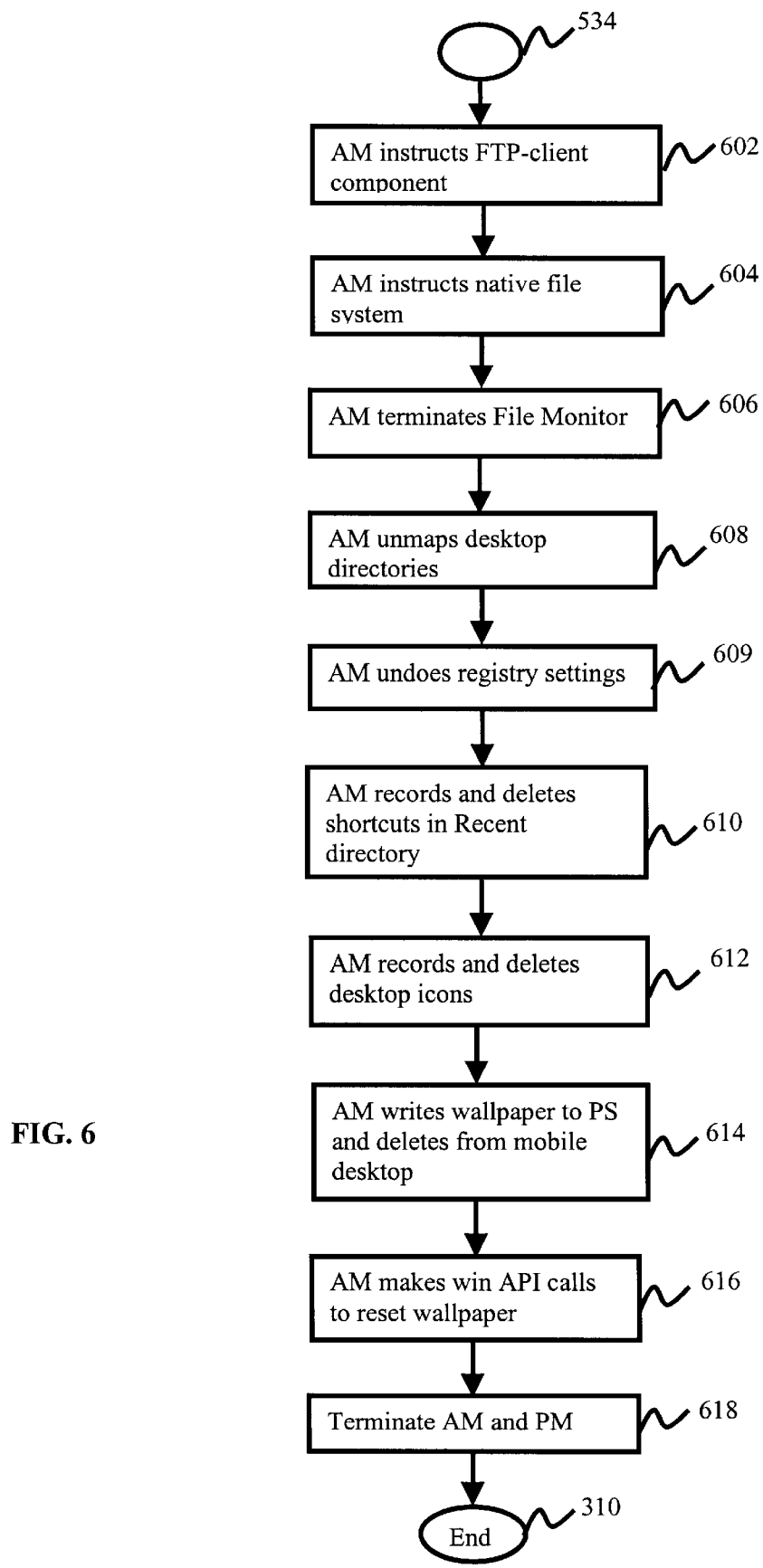
FIG. 6 is a detailed flow diagram illustrating the modules of the Terminate Session process shown in FIG. 3.

For purposes of brevity, regardless of whether the program application 208 execution is performed on the client 202 or the computation.server 234, reference is only made to the components in the client 202 to describe the execution on the client 202 with reference to FIG. 5b. It is to be appreciated, however, that any reference to the components in the client 202 is to be similarly extended to the mirror components in the computation server 234 for a construction of the execution on the computation server 234.

In FIG. 5b when the application program 208 is executed, a file-open request is generated in relation to a file that the application program 208 requires for execution, and is provided as input to the kernel mode 206. The Virtual Device Driver 218 intercepts the file-open request in an Intercept Request module 542, and subsequently performs a check on the file-open request in a Test File Condition module 544. In the Test File Condition module 544, the Virtual Device Driver 218 checks if the file-open request is made to a file residing on local storage on the client 202. If the condition tests true (YES), a Native File System module 545 assumes control and in this module, the Virtual Device Driver 218 provides as input the file-open request to the Native File System 212 for retrieval of the file. Subsequently, an Intercept Other Requests module 552 assumes control and loops the Sustain Session process 306 back to the beginning of the process for intercepting other file-open requests, file-modify requests and directory related requests. Additionally in the Intercept Other Requests module 552, the Virtual Device Driver 218 maintains information of such requests internally.

If in the Test File Condition module 544, the condition tests false (NO), a Test New Condition module 546 assumes control. In the Test New Condition module 546, the Virtual Device Driver 218 performs another check on the file-open request to determine if the file is being requested for the first time in this session. If the condition tests false (NO), the file-open request is made to a file that has been previously requested and downloaded from the FTP Server 224 to the local storage on the client 202. A Modify Request module 548 then assumes control and in this module, the Virtual Device Driver 218 modifies the file-open request to point to the local storage on the client 202 for opening the downloaded copy of the file. The Modify Request module 548 then passes control to the Native File System module 545.

If in the Test New Condition module 546 the condition tests true (YES), the file-open request is made to a file that has not been previously requested and downloaded from the FTP server 224 to the local storage on the client 202. Hence, a Request FTP module 550 assumes control and in this module, the Virtual Device Driver 218 provides input to the FTP Client 220 to establish communications with the FTP Server 224 for downloading the file from the FTP Server 224. The Virtual Device Driver 218 then receives from the FTP Client 220 the file and causes the file to be stored on the local storage on the client 202. The Modify Request module 548 assumes control thereafter.

If during the operation of the Run Program process 306, the computer user chooses to exit the mobile computing environment network account, the Run Program process 306 terminates and the Terminate Session process 308 commences.

The Terminate Session process 308 begins with an Instruct FTP module 602 where the Account Manager 214 provides input to the FTP Client 220 to propagate modified files and directories back to the FTP Server 224. The FTP Client 220 hence establishes communications with the FTP Server 224 for such a purpose. Thereafter, the Instruct FTP module 602 passes control to an Instruct Native File System module 604.

In the Instruct Native File System module 604, the Account Manager 214 provides input to the Native File System 212 for deleting all files and directories downloaded from the FTP Server 224 during the Run Program Session process 306. The Account Manager 214 then in a Terminate FTP module 606 terminates the Virtual Device Driver 218 and the FTP Client 220.

An Unmap module 608 subsequently assumes control and in this module, the Account Manager 214 undoes the new directory mapping 720 through processing the mobile desktop drives by using a Windows "net use drive /d" command or a DOS "subst drive /d" command. After completion, the Unmap Module 608 passes control to an Undo Registry module 609 where the Account Manager 214 deletes the registry settings that are added in the Download Registry module 418.

Subsequently, a Record module 610 assumes control. In the Record Documents module 610, the Account Manager 214 records shortcuts to mobile desktop documents in the windowsRecent directory on the Profile Server 222 and then deletes the shortcuts from the directory. Similarly, the Account Manager 214 records shortcuts to mobile desktop application programs and documents in the windows Desktop directory on the Profile Server 222 and thereafter deletes the shortcuts from the directory after a Record Application Programs module 612 assumes control from the Record Documents module 610.

Subsequently in a Write Wallpaper module 614, the Account Manager 214 writes any altered file for a changed new wallpaper 714 to the Profile Server 222 and deletes the altered file from the client 202. Thereafter in an API Reset module 616, the Account Manager 214 makes a Windows API call to reset the new wallpaper 714 on the desktop 704 to the wallpaper 706.

The Terminate Session process 308 ends with a Terminate AM and PM module 618 where the Account Manager 214 and Process Manager 226 are terminated. The client 202 is hence restored to the Windows computing environment before the personalized consistent Windows computing environment was attached to the client 202.

In another embodiment, the client 202 supports a plurality of file access protocols, which are implemented by an FTP client and a HTTP client in the File Monitor 216, together with SMB and NFS clients layered below the Native File a System 212. When a request for a file on a remote storage server is received, the VxD 218 selects one of the protocols to service the request as follows. First, the VxD 218 compares the IP address of the client 202 with a list of network addresses that the a remote storage server supports for each protocol. Next, a protocol is chosen from those protocols that the client 202 is allowed to use, according to a pre-specified ranking (for example, SMB over NFS over FTP over HTTP, because the SMB and NFS protocols are more efficient than FTP and HTTP protocols). Once a protocol is chosen, the VxD 218 routes the file request to the corresponding file access client.

The foregoing protocol selection mechanism enables files to be accessed using the most preferred protocol, taking into account characteristics of the current network connection such as whether there is a firewall between the client 202 and the remote storage server.

DESCRIPTION OF THE FILE MONITOR

Figure 8:
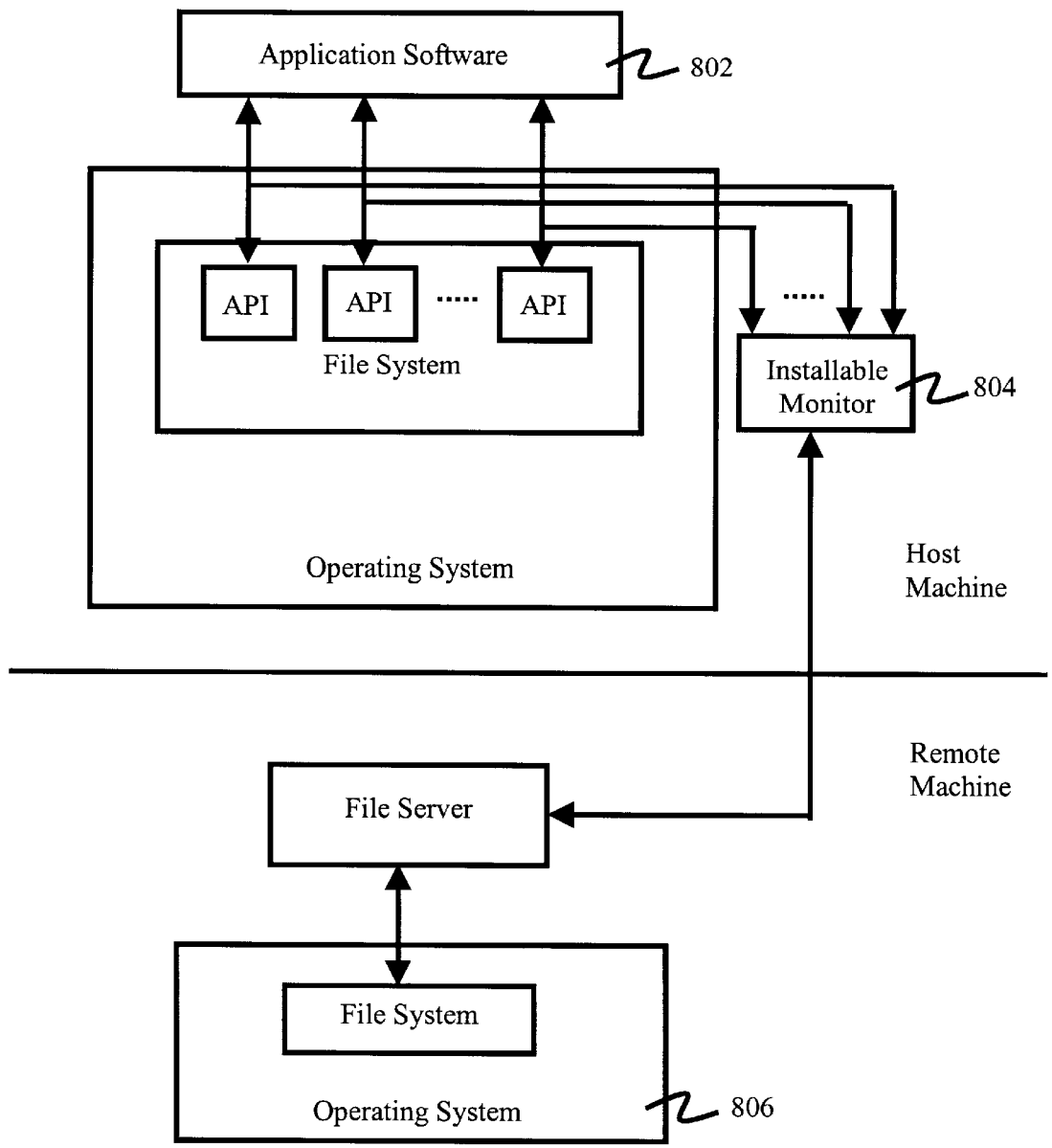
FIGS. 8 and 9 are block diagrams illustrating the components of a computer implemented with the File Monitor of FIGS. 2a and 2b for providing a detailed description of the File Monitor.

To enable a better appreciation of the File Monitor 216 and its operation, reference is made to FIG. 8 for a more detailed description. The File Monitor 216 enables software 802 to be installed and run on a host machine, without requiring the underlying files to be physically available on any of the local storage drives. Instead, every file request from the software 802 is trapped by an installable monitor 804 (the File Monitor 216), which dynamically downloads the target file from a remote file server 806 to a local storage medium if the file has not already been downloaded. The installable monitor 804 thereafter directs the native file system-of the host machine to operate on the downloaded file in order to satisfy the file request. Even requests for a file at an absolute path on a specific drive (e.g. a CD-ROM drive) are redirected to the downloaded file, which is likely to reside at a different path on a different drive. The downloaded file can optionally be removed when the software closes the file, or when the software 802 terminates. Consequently, a host machine can run application software 802 without having a physical medium containing all the underlying files.

Figure 9:
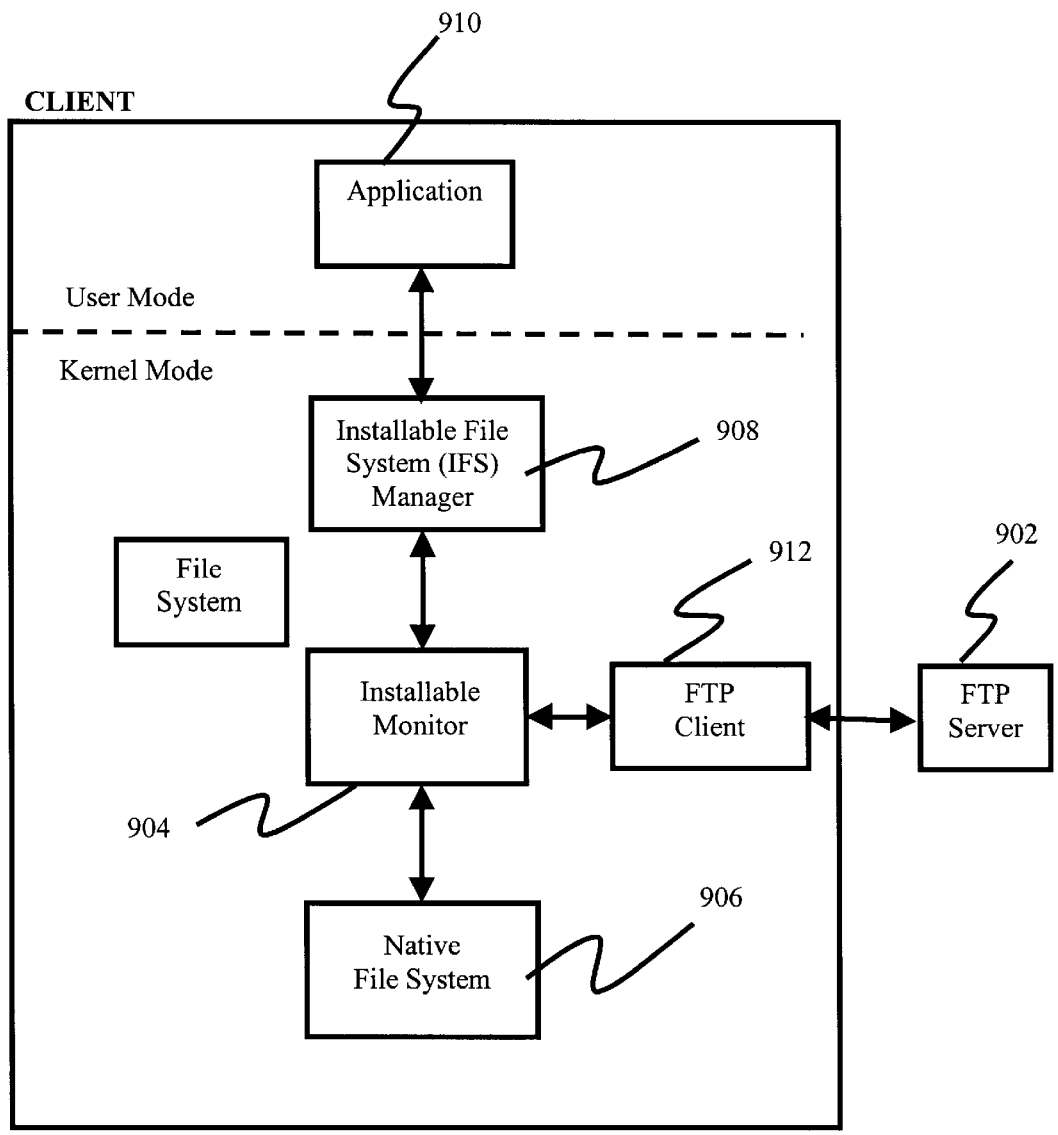

In one implementation as illustrated in FIG. 9, the file server is a standard FTP server 902 using the FTP communications protocol. The communications network is the Internet. The user's computer has Windows 95 as its operating system, and the FTP server 902 has a Solaris operating system. However, those skilled in the art should appreciate that different operating systems have similar features and functions, so that the installable monitor 804 is not limited to use only in connection with these operating systems.

The installable monitor 804 on the user's computer has two components: a virtual device driver (VxD) 904 and an FTP client 912, both inside the operating system kernel. The VxD 904 is implemented in such a way that the VxD 904 is layered on top of the native file system 906. The VxD 904 is implemented as a hook that gets installed below the installable file system (IFS) manager interface 908. A hook is a programming device that alters program flow away from the original intent. Consequently, for selected program flow threads progressing through the IFS manager interface 908, program flow is routed to the VxD 904 rather than to the native file system 906 as originally intended. The VxD 904 is then free to either satisfy the request and return program flow back to the requesting thread or modify the request before directing the request to the native file system 906.

The native file system 906 may include function routines directed towards file rights, file locking, file transaction tracking and the like. These are of little importance to the installable monitor 804, and hence hooks are omitted for such functions. The selected functions for which hooks are implemented are indicated in the following table:

| | | |
|---|---|---|
| CreateFile | WriteFile | FindNextFile |
| CloseFile | GetFilesize | GetFileAttributes |
| ReadFile | FindFirstFile | GetFileTime |
| CreateDirectory | DeleteFile | |

The precise processes and program flow used in hooking these function routines are unimportant for the purposes of the installable monitor 804. Such hooking may be implemented any number of different ways, as is known to those skilled in the art. For example, published information describing the operating system may indicate the definition of the IFS manager interface 908 for various function routines supported by the native file system 906. To the extent that published information is lacking, hook locations may be determined empirically.

For each function routine that is hooked, the VxD 904 blocks the execution of the request inside the kernel, determines the path name of the request issued by the application and translates the request into the equivalent remote path name on the file server 902. This remote path name is then passed to the FTP client 912 using known event notification mechanisms. The FTP client 912 then translates the request into an FTP request and forwards the FTP request to the FTP server 902. The FTP client 912 waits for a response from the FTP server 902 and, once the file has been downloaded onto the user's machine, the FTP client 912 saves the file to another location on the user's machine's local storage media. Confirmation of the download is passed to the VxD 904, together with the location of the local copy of the file. The VxD 904 then redirects the native file system 906 to satisfy the request made by the application 910 using the local copy, and the application 910 continues as normal. The application 910 is unaware that the files and data are being accessed on-line rather than on a local drive. After the application 910 finishes execution, or closes the file, or after a pre-determined number of uses or after a pre-determined number of days, (these options may be configurable) one or more or all of the downloaded files are deleted from the user's machine.

DESCRIPTION OF A COMPUTER PROGRAM PRODUCT

Figure 10:
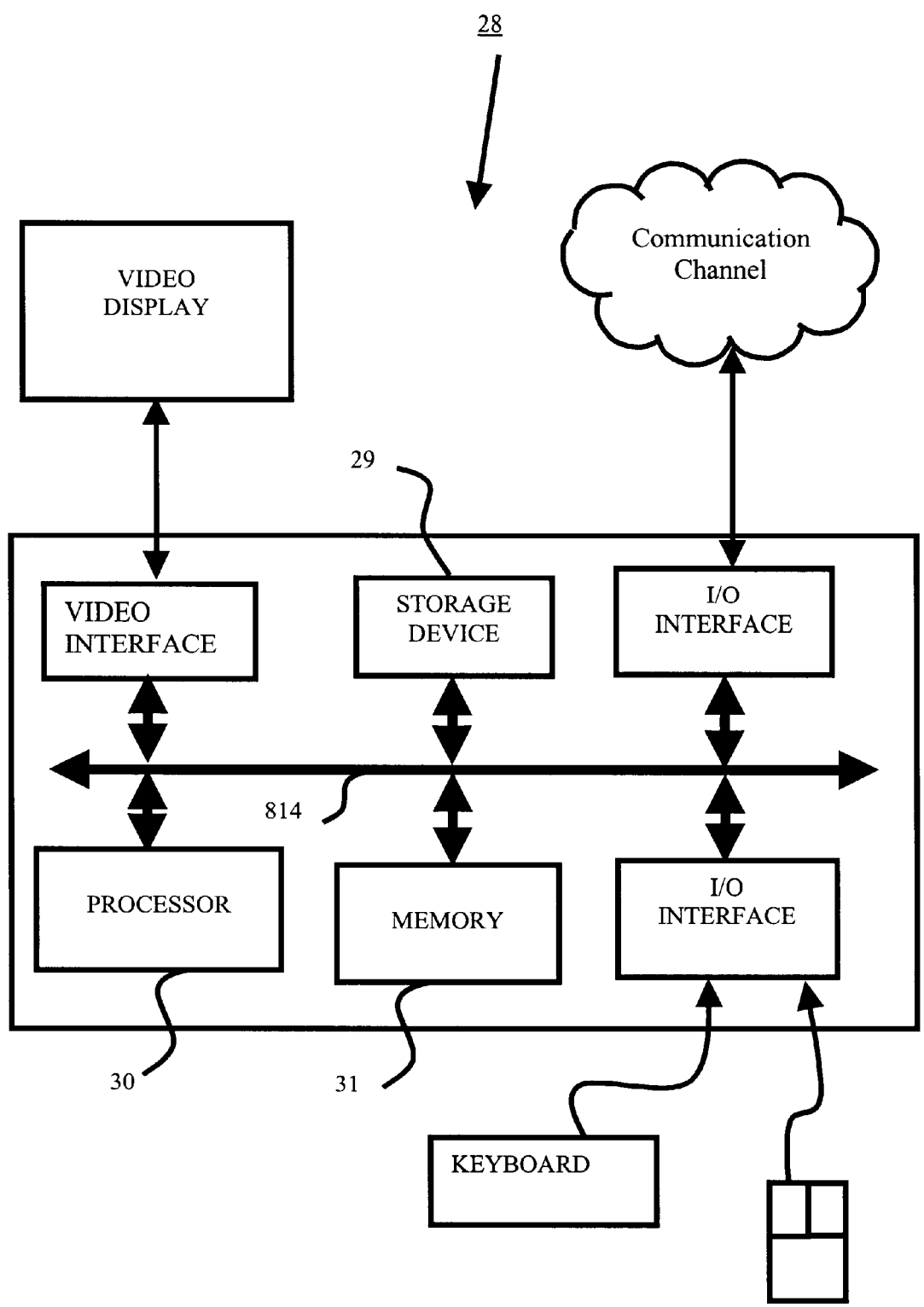
FIG. 10 illustrates a general-purpose computer by which the embodiments of the invention are preferably implemented.

The embodiments of the invention are preferably implemented using a computer, such as the general-purpose computer shown in FIG. 10. In particular, the functionality or processing of the system of FIGS. 1 to 9 can be implemented as software, or a computer program, executing on the computer. The method or process steps for migrating a consistent and dynamically-adaptive distributed processing mobile computing environment to a computer connectable to a mobile computing environment network are effected by instructions in the software that are carried out by the computer. The software may be implemented as one or more modules for implementing the process steps. A module is a part of a computer program that usually performs a particular finction or related functions. Also, as described in the foregoing, a module can also be a packaged functional hardware unit for use with other components or modules.

In particular, the software may be stored in a computer readable medium, including the storage devices described below. The software is preferably loaded into the computer from the computer readable medium and then carried out by the computer. A computer program product includes a computer readable medium having such software or a computer program recorded on it that can be carried out by a computer. The use of the computer program product in the computer preferably effects an advantageous apparatus for providing a low data transmission rate and intelligible speech communication in accordance with the embodiments of the invention.

The system 28 is simply provided for illustrative purposes and other configurations can be employed without departing from the scope and spirit of the invention. Computers with which the embodiment can be practiced include IBM-PC/ATs or compatibles, one of the Macintosh (TM) family of PCs, Sun Sparcstation (TM), a workstation or the like. The foregoing is merely exemplary of the types of computers with which the embodiments of the invention may be practiced. Typically, the processes of the embodiments, described hereinafter, are resident as software or a program recorded on a hard disk drive (generally depicted as block 29 in FIG. 10) as the computer readable medium, and read and controlled using the processor 30. Intermediate storage of the program and any data may be accomplished using the semiconductor memory 31, possibly in concert with the hard disk drive 29.

In some instances, the program may be supplied to the user encoded on a CD-ROM or a floppy disk (both generally depicted by block 29), or alternatively could be read by the user from the network via a modem device connected to the computer, for example. Still further, the software can also be loaded into the computer system 28 from other computer readable medium including magnetic tape, a ROM or integrated circuit, a magneto-optical disk, a radio or infra-red transmission channel between the computer and another device, a computer readable card such as a PCMCIA card, and the Internet and Intranets including email transmissions and information recorded on Websites and the like. The foregoing is merely exemplary of relevant computer readable mediums. Other computer readable mediums may be practiced without departing from the scope and spirit of the invention.

In the foregoing manner, a computing system, a method, and a computer program product for providing portable or mobile computing within the context of a network are described. In particular, a computing environment may be migrated to any computer that is connectable to the network for providing a user with a consistent and dynamically-adaptive distributed processing mobile computing environment. However, it will be apparent to one skilled in the art in view of this disclosure that numerous changes and/or modification can be made without departing from the scope and spirit of the invention.

I claim:

1. A computing system for providing a mobile computing environment of settings, accessible programs and accessible files for a user, said computing system being connectable to remote storage and having a local computing environment of settings, accessible programs and accessible files, an operating system, and a local storage, said computing system including:

an application program;

means for invoking said application program; and means for allocating a location for executing said application program when said application program is invoked, wherein at least a portion of said allocating means is intermediate between said application program and said operating system.

2. The system as in claim 1, further including means for migrating said mobile computing environment therewithin and wherein said mobile computing environment includes said application program and said invoking means.

3. The system as in claim 2, wherein said means for migrating said mobile computing environment further includes:

means for mapping a user-interface portion of said mobile computing environment onto said local computing environment using information transferred from said remote storage being connected to said system, said mapping means being actuable by said user;

a file system in said operating system for receiving and translating requests for performing file operations on said local storage; and means for monitoring and intercepting a request made to said file system for operation on a file, said request being actuable by said mapped user-interface and said file being stored on said remote storage being connected to said system.

4. The system as in claim 1, wherein said allocating means is communicable with a computation server to which the execution location is allocable.

5. The system as in claim 4, wherein said allocating means is communicable with means for monitoring and coordinating the execution of said application program on said computation server.

6. The system as in claim 4, being operable to communicate with said computation server for remote control of said computation server.

7. The system as in claim 6, further including means for remote control of said computation server, said remote control means being communicable with said computation server.

8. The system as in claim 4, wherein said application program has operational requirements and said allocating means is dependent on said operational requirements for allocating the execution location of said application program.

9. The system as in claim 8, wherein said allocating means matches said operational requirements with resources of said system and said computation server for allocating the execution location of said application program.

10. The system as in claim 9, wherein said operational requirements include at least one of:

operating system type;

memory size; and processing speed.

11. A computation server for providing a mobile computing environment of settings, accessible programs and accessible files for a user on a computing system, said computation server being connectable to remote storage and having a local computing environment of settings, accessible programs and accessible files, an operating system, and a local storage, said computation server including:

means for communicating information of resources on said computation server for allocation of a location for executing an application program resident on said computing system; and means for monitoring and coordinating the execution of said application program when allocated to said computation server.

12. The server as in claim 11, further including means for remote control of said server by said computing system, wherein said remote control means is communicable with said computing system.

13. The server as in claim 12, wherein said monitoring means is communicable with said remote storage for migrating said mobile computing environment to said server for enabling the execution of said application program on said server.

14. The server as in claim 13, wherein said migration of said mobile computing environment further includes:
   means for mapping said mobile computing environment onto said local computing environment using information transferred from said remote storage being connected to said server;
   a file system in said operating system for receiving and translating requests for performing file operations on said local storage; and
   means for monitoring and intercepting a request made to said file system for operation on a file, said request being actuable by the execution of said application and said file being stored on said remote storage being connected to said server.

15. A method for providing a mobile computing environment of settings, accessible programs and accessible files to a computing system for a user, said computing system being connectable to remote storage and having a local computing environment of settings, accessible programs and accessible files, an operating system, and a local storage, said method including the steps of:
   providing an application program;
   invoking said application program; and
   between said application program and said operating system allocating a location for executing said application program when said application program is invoked.

16. The method as in claim 15, further including the step of migrating said mobile computing environment to said system wherein said mobile computing environment includes said application program.

17. The method as in claim 16, wherein said migrating step further includes:
   mapping a user-interface portion of said mobile computing environment onto said local computing environment using information transferred from said remote storage being connected to said system, said mapping being actuable by said user;
   receiving and translating in a file system in said operating system requests for performing file operations on said local storage; and
   monitoring and intercepting a request made to said file system for operation on a file, said request being actuable by said mapped user-interface and said file being stored on said remote storage being connected to said system.

18. The method as in claim 15, wherein said allocating step further includes communicating with a computation server to which the execution location is allocable.

19. The method as in claim 18, wherein said communicating step further includes monitoring and coordinating the execution of said application program on said computation server.

20. The method as in claim 18, wherein said communicating step further includes providing remote control of said computation server.

21. The method as in claim 18, wherein said application program has operational requirements and said allocating step further includes determining said operational requirements.

22. The method as in claim 21, wherein said allocating step further includes matching said operational requirements with resources of said system and said computation server.

23. The method as in claim 22, wherein said allocating step further includes determining said operational requirements that include at least one of:
   operating system type;
   memory size; and
   processing speed.

24. A method for providing a mobile computing environment of settings, accessible programs and accessible files for a user on a computing system using a computation server, said computation server being connectable to remote storage and having a local computing environment of settings, accessible programs and accessible files, an operating system, and a local storage, said computation server including:
   communicating information of resources on said computation server for allocation of a location for executing an application program resident on said computing system; and
   monitoring and coordinating the execution of said application program when allocated to said computation server.

25. The method as in claim 24, further including the step of providing remote control of said server by said computing system by providing communication between said server and said computing system.

26. The method as in claim 25, wherein said monitoring step further includes communicating with said remote storage for migrating said mobile computing environment to said server for enabling the execution of said application program on said server.

27. The method as in claim 26, wherein said migrating step further includes:
   mapping said mobile computing environment onto said local computing environment using information transferred from said remote storage being connected to said server;
   receiving and translating in a file system in said operating system requests for performing file operations on said local storage; and
   monitoring and intercepting a request made to said file system for operation on a file, said request being actuable by the execution of said application and said file being stored on said remote storage being connected to said server.

28. A computer program product for providing a mobile computing environment of settings, accessible programs and accessible files for a user including:
   a computer usable medium having computer readable program code means embodied in said medium for causing said mobile computing environment to be provided to a computing system, said computing system being connectable to remote storage and having a local computing environment of settings, accessible programs and accessible files, an operating system, and a local storage, said computer program having:
      computer readable program code means for providing an application program;
      computer readable program code means for invoking said application program; and intermediate computer readable program code means between said application program and said operating system for allocating a location for executing said application program when said application program is invoked.

29. The product in claim 28, further including computer readable program code means for migrating said mobile computing environment to said system wherein said mobile computing environment includes said application program.

30. The product in claim 29, wherein said computer readable program code means for migrating further includes;

computer readable program code means for mapping a user-interface portion of said mobile computing environment onto said local computing environment using information transferred from said remote storage being connected to said system, said mapping being actuable by said user;

computer readable program code means for receiving and translating in a file system in said operating system requests for performing file operations on said local storage; and computer readable program code means for monitoring and intercepting a request made to said file system for operation on a file, said request being actuable by said mapped user-interface and said file being stored on said remote storage being connected to said system.

31. The product as in claim 28, wherein said computer readable program code means for allocating further includes computer readable program code means for communicating with a computation server to which the execution location is allocable.

32. The product as in claim 31, wherein said computer readable program code means for communicating further includes computer readable program code means for monitoring and coordinating the execution of said application program on said computation server.

33. The product as in claim 31, wherein said computer readable program code means for communicating further includes computer readable program code means for providing remote control of said computation server.

34. The product as in claim 31, wherein said application program has operational requirements and said computer readable program code means for allocating further includes computer readable program code means for determining said operational requirements.

35. The product as in claim 34, wherein said computer readable computer program code means for allocating further includes computer readable program code means for matching said operational requirements with resources of said system and said computation server.

36. The product as in claim 35, wherein said computer readable program code means for allocating further includes computer readable program code means for determining said operational requirements that include at least one of:
 operating system type;
 memory size; and
 processing speed.

37. A computer program product for providing a mobile computing environment of settings, accessible programs and accessible files for a user on a computing system, including:

a computer usable medium having computer readable program code means embodied in said medium for causing said mobile computing environment to be provided using a computation server, said computation server being connectable to remote storage and having a local computing environment of settings, accessible programs and accessible files, an operating system, and a local storage, said computer program product having:

computer readable program code means for communicating information of resources on said computation server for allocation of a location for executing an application program resident on said computing system; and computer readable program code means for monitoring and co-ordinating the execution of said application program when allocated to said computation server.

38. The product as in claim 37, further including computer readable program code means for providing remote control of said server by said computing system by providing communication between said server and said computing system.

39. The product as in claim 38, wherein said computer readable program code means for monitoring further includes computer readable program code means for communicating with said remote storage for migrating said mobile computing environment to said server for enabling the execution of said application program on said server.

40. The product as in claim 39, wherein said computer readable program code means for migrating further includes:

computer readable program code means for mapping said mobile computing environment onto said local computing environment using information transferred from said remote storage being connected to said server;

computer readable program code means for receiving and translating in a file system in said operating system requests for performing file operations on said local storage; and computer readable program code means for monitoring and intercepting a request made to said file system for operation on a file, said request being actuable by the execution of said application and said file being stored on said remote storage being connected to said server.

* * * * *